United States Patent Office 3,331,871
Patented July 18, 1967

3,331,871
METHOD OF PREPARING ACROLEIN AND ACRYLIC ACID
Charles E. Ziegler, Therwil, Basel-Land, Switzerland, and Jamal S. Eden, Akron, Ohio, assignors to The B. F. Goodrich Company, New York, N.Y., a corporation of New York
No Drawing. Filed Jan. 27, 1964, Ser. No. 340,543
8 Claims. (Cl. 260—533)

This invention relates to a new and useful catalyst and to a method for preparing acrolein and acrylic acid by passing a mixture of propylene and an oxygen containing gas over the catalyst at an elevated temperature, and, more particularly, pertains to a catalyst comprising oxides of Ni, Mo, tellurium and rhenium, and to a method for preparing acrolein and acrylic acid by passing a mixture of at least stoichiometric proportions of an oxygen containing gas and propylene over or through the catalyst at a temperature of from about 300 to about 450° C.

Because of the ready availability of propylene as a petroleum derived chemical, numerous attempts have been made to use it as an ingredient for the preparation of useful oxidation products having three carbon atoms.

Nickel molybdate in admixture with $TeO_2$ has been described as a catalyst for the preparation of acrolein and acrylic acid in Belgian Patent 623,214, but the conversion of propylene per pass is 68% and the yield of useful oxidation products based on the propylene converted is 25% for acrylic acid and 7.5% for acrolein. The efficiency is only of the order of 22.1% at a temperature of 367° C.

With the catalyst of this invention it is possible to obtain conversions of propylene per pass ranging from about 68 to substantially 100% with efficiencies from 45.5 to as high as 81. It is therefore apparent that the process can be adusted to obtain sufficiently high conversions of propylene and yields of acrolein and acrylic acid so as to avoid the necessity of recycling propylene. The small quantities of propylene that may remain unreacted can be burned with the vent gases.

In the process small quantities of carbon monoxide, carbon dioxide, acetic acid and acetaldehyde are also formed.

THE REACTANTS

The propylene can be a commercial grade or it can contain substantial quantities up to 50% of propane or other saturated volatile aliphatic hydrocarbons. The saturated hydrocarbons will consume some oxygen during the reaction but do not interfere substantially with the oxidation of the propylene to acrolein and acrylic acid. The only effect of saturated hydrocarbons appears to be the competition for some of the oxygen. Thus, if propylene containing substantial amounts of saturated hydrocarbons is used, the amount of oxygen should be adusted to compensate for that used in oxidizing the paraffins. Ethylene is also oxidized in part, but its effect also seems to be utilization of part of the oxygen. A large proportion of the ethylene goes through the reactor intact. The butylenes are also oxidized, but these are converted primarily to carbon oxides, with only small amounts of unsaturated aldehydes or acids having four carbon atoms.

The oxygen can be supplied as air, as commercially pure oxygen or as oxygen enriched air. The ratio of oxygen should be at least stoichiometric, i.e. at least 1½ mols per mol of propylene and preferably from 33 to 100% excess based on the stoichiometric ratio. Ratios of oxygen less than stoichiometric will also convert some of the propylene to acrolein and acrylic acids, but generally the percentage of propylene converted is fairly low and the yields of desired product is lower than when an excess of oxygen is used. Any blend of oxygen and an inert gas can be employed as the oxidizing ingredient.

It is desirable, but not essential, to use water vapor along with the propylene and oxygen. The role of water is not clearly known. With no water vapor, usually conversion of propylene and yields of desired products are somewhat lower than that when the reaction is run in the presence of steam. The amount of water vapor is not critical and from about 2 to about 6 mols per mol of propylene can be used. The most preferable range of water is from about 2.5 to 4.5 mols per mol of propylene. Of course, if water presents a problem in the separation steps after the reaction is completed, then none need be used, but a slight sacrifice in yield usually results.

REACTION CONDITIONS

The temperature should be between 300 and 450° C., and preferably between 350 and 425° C. Below 300° C. the oxidation of propylene is too slow to be practical. Above 450° C. there appears to be a considerable amount of oxidation of both acrolein and acrylic acid, and such oxidation can be observed to occur at a slow rate as low as 450° C. in the presence of the catalyst.

The reaction or contact time can vary from about 5 to about 40 seconds. For practical reasons a reaction time of from 7 to about 30 seconds is preferred.

The reaction can be run in either fixed or fluid bed systems. Because of the advantages of easier temperature control with a fluid bed system, it is preferred. The oxidation is quite exothermic and development of hot spots in a fixed bed system is possible unless careful attention is given to the control of the temperature.

CATALYST AND PREPARATION

The catalyst comprises either (1) a mixture of oxides of Ni, Mo, Te, and $HReO_4$ or $Re_2O_7$ or (2) $NiMoO_4$ containing $TeO_2$ or nickel tellurite and $HReO_4$ or $Re_2O_7$ or (3) a mixture of $NiMoO_4$, $MoO_3$, $TeO_2$ and $HReO_4$ or $Re_2O_7$.

| | Mols |
|---|---|
| $MoO_3$ or its equivalent | 800 |
| NiO or its equivalent | 160–800 |
| $TeO_2$ | 25–375 |
| $HReO_4$ or its equivalent as $Re_2O_7$ | 1–6 |

The nickel and molybdenum can be present either as oxides or as nickel molybdate or as a mixture of nickel molybdate and nickel oxide. The preferred range of ingredients is 800 mols of molybdenum oxide, 670–750 nickel oxide or salt, 50–200 $TeO_2$ or other tellurite and 1–2 of rhenium oxide.

For preparing a catalyst of the type defined under (1) above it is necessary merely to blend thoroughly the ingredients of the mixture.

For preparing a catalyst of the type defined under (2) above a typical procedure is to dissolve 101.79 g. of $Ni(NO_3)_2 \cdot 6H_2O$ in 100 ml. water by heating to about 50° C., dissolve 74.17 g. of ammonium molybddate in 100 ml. water at about 50° C. Add the ammonium molybdate solution to the nickel nitrate. Dissolve 4.2 g. of tellurium oxide in 8 ml. concentrated HCl, and add to the mixture. Thereafter add sufficient concentrated $NH_4OH$ dropwise until neutral. Add an aqueous solution of perrhenic acid or ammonium perrhenate. Mix well and evaporate to dryness in hot air at 80–90° C. Bake the dried catalyst at 400° C. for about 16 hours. The rhenium compounds can also be added as perrhenic acid, ammonium perrhenate or $Re_2O_7$ to a paste of the remaining ingredients prior to drying. After baking the catalyst is crushed and sieved. Mesh sizes 10–18 (U.S. Sieve) are used for fixed bed systems and 80–325 mesh for fluid bed processes.

For making catalysts with less than equivalents amounts of nickel (i.e. catalyst containing a mixture of nickel molybdate and $MoO_3$) less than equivalent amounts of nickel salts should be used.

For preparing supported catalysts on colloidal silica, the silica can be added to the aqueous catalyst mixture or vice versa, prior to drying. Thereafter, the catalyst is treated as above.

If the support is a porous microspheroidal material, such as microspheroidal silica gel having a surface area of about 325 m. per g. it is preferable to first treat the silica with concentrated $NH_4OH$, filter until fairly dry, then suspend the silica in water and add the solution of ammonium molybdate and nickel nitrate, tellurium and rhenium compound in increments prior to neutralization, while drawing a vacuum on the mixture of ingredients to attempt to fill all the interstices of the silica gel with the catalyst. After completing the blending of all the materials, the supported catalyst is dried, baked, crushed and sieved.

Alternately, the catalyst can be prepared by first making a paste with the molybdate and nickel ingredients and then thoroughly mixing in the $TeO_2$ and the $HReO_4$.

The examples which follow are intended only as detailed explanations of the invention and not as limitations.

Example I

The catalyst used in this test had a molar ratio of 670 Ni, 800 $MoO_3$, 50 $TeO_2$ and 1 Re. It was prepared by dissolving, separately, the required amount of ammonium molybdate and nickelous nitrate in water at 50° C. and then adding the ammonium molybdate solution to the nickelous nitrate solution. A solution of the required amount of tellurium oxide in a small amount of concentrated HCl is added at 50° C. to the solution of nickel and molybdenum salts. At this stage the aqueous solution contains no precipitate. The mixture is now neutralized with concentrated $NH_4OH$ to form a precipitate. The requisite amount of ammonium perrhenate is added. The mixture is thoroughly mixed, dried and baked at 400° C. for 16 hours. The finished catalyst was crushed and screened to 8–18 mesh sieve (U.S. screen designation) for fixed bed runs and 80–325 mesh sieve for fluid bed runs.

Approximately 60 ml. of the catalyst were placed in a fixed bed reactor which consisted of a high silica glass tube about 28 cm. long, and 22 mm. outer diameter. It was wound with three sets of electrical heating elements, one of which extended along the entire length of the reaction section and each of the other two extended about one-half the length of the reactor. The reactor contained an inlet for propylene, one for an oxygen containing gas and one for steam. The reactor also contained a thermocouple well, so that the temperature in the reaction area could be determined. The gaseous effluents from the reactor were passed through a drying tube and then a vapor phase chromatograph for continuous analysis of the products of the reaction.

The feed gases were preheated to a temperature of about 120–200° C. before entering the reactor. The feed consisted of sufficient air to provide 2½ mols of oxygen per mol of propylene and 4 mols of steam per mol of propylene. The cold contact time was calculated at 18 seconds.

At a temperature of 390° C., 83.3% of the propylene was converted with yields of 37% acrolein and 39.7% acrylic acid. The respective efficiencies were 30.8% and 33.1%. At 400° C., 87.6% of the propylene was converted giving a yield of 26.8% acrolein and 49.7% acrylic acid. The respective efficiencies were 23.5% and 43.5%.

Another catalyst with a molar ratio of 800 Ni, 800 $MoO_3$, 50 Te and 1 Re was used with the same reactant ratios and contact time as described above. At 380° C. the propylene conversion was 78.9%, the acrolein yield was 69.9% and acrylic acid yield was 18.1%. At 405° C. 88.8% of the propylene was converted with yields of 54.1% acrolein and 25.5% of acrylic acid.

Example II

A catalyst base was prepared by dissolving 176.6 g. of $(NH_4)_6Mo_7O_{24} \cdot 4H_2O$ in 400 ml. water, dissolving 191.93 g. of $Ni(NO_3)_2$ and 89.37 g. of $NiSO_4 \cdot 6H_2O$ in 400 ml. water, adding the nickel salt solution to the molybdate solution and neutralizing with ammonia. The precipitate was then filtered and washed by resuspension in water until there was only a faint green color in the wash water. Tellurium oxide and $Re_2O_7$ were added to the paste in quantities to provide catalysts with a ratio of 400 Ni, 400 $MoO_3$, 25 Te and 1 Re, and 500 Ni, 500 $MoO_3$, 25 Te and 1 Re, as oxides.

Each catalyst was added to the reactor in 60 ml. volume. The reactant ratios were the same as in the previous example, contact time was 18 seconds.

With the catalyst having a Ni, Mo, Te, Re ratio of 400, 400, 25, 1 at 355° C., 77.93% of propylene was converted to yield 63.4% acrolein and 25.7% acrylic acid. This same catalyst at 375° C. converted 93.1% of the propylene, to yield 54.5% acrolein and 31.9% acrylic acid.

The catalyst with a ratio of 500 Ni, 500 Mo, 25 Te and 1 Re when used with the same reactant ratios and reaction conditions as above but at a temperature of 360° C. converted 89.5% of the propylene with yields of 36.2% acrolein and 41.9% of acrylic acid. At 370° C. the propylene conversion was 94.3% with a 24.5% yield of acrolein and 47.65% yield of acrylic acid.

With a catalyst having a ratio of 660 Ni, 660 Mo, 80 Te and 1 Re, at 340° C. and the remaining conditions and reactant ratios as above, 72.9% propylene conversion is obtained with 34.1% yield of acrolein and 24.4% yield of acrylic acid.

At Ni 800, Mo 800, Te 40 and Re 1 ratios at 330° C. with the remaining reaction conditions and reactant ratios as above about 50% of propylene is converted with yields of 33.8% acrolein and 22.5% of acrylic acid.

This example shows that small amounts of rhenium will cause the reaction to proceed at considerably lower temperatures with good conversions of propylene and good yields of acrolein and acrylic acid.

The following example shows results obtained in a fluid bed reactor with an unsupported catalyst.

The reactor was a high silica glass tube having an inner area of 9.08 $cm.^2$ and a length of 5 ft. The reactor was heated externally by use of an electrical heating element. Means were provided for preheating the reactants. A sintered glass plate was placed in the bottom of the reactor to keep the catalyst from entering the reactant inlets. In these runs the catalyst was fluidized with hot air or a mixture of hot air and steam. The reactor temperature was adjusted to 30–50° C. below that desired for oxidation of the propylene. Thereafter, propylene was fed into the reactor and the reaction was allowed to proceed at the desired temperature. In all cases the gases entering the reactor were heated to about 250–300° C. before making contact with the catalyst.

Oxygen containing gas (air) was diluted with superheated steam before mixing with propylene. The feed mixture contained 1.5 mols oxygen and 4.2 mols water vapor per mol of propylene. The hot contact time was 17.6 seconds and the temperature was 325° C. The catalyst had a molar ratio of 660 NiO, 800 $MoO_3$, 50, $TeO_2$ and 1 $HReO_4$. It was prepared by the procedure described in Example I.

Under these reaction conditions 89% of the propylene was converted, with a 13.9% yield of acrolein and a 36.1% yield of acrylic acid. The respective efficiencies were 12.4 and 32.1%.

It is apparent to those skilled in the art that numerous variations with respect to the catalyst composition, the ratio of reactants and reaction conditions are possible without departing from the spirit and scope of the invention as defined in the claims.

We claim:
1. A method of preparing a mixture of acrolein and acrylic acid, comprising passing a mixture of propylene and an oxygen containing gas in a molar ratio of from about 1.5 to about 3 mols of oxygen per mol of propylene and up to 6 mols of water vapor per mol of propylene through a catalyst bed at a temperature of from about 300 to about 450° C. with a contact time of from about 5 to about 40 seconds, the said catalyst consisting essentially of in a molar ratio 800 Mo, 160–800 Ni, 25–375 $TeO_2$ and 1–6 Re calculated as oxides.

2. The method of claim 1 in which the molar ratio of the catalyst is 670 Ni, 800 Mo, 50 Te and 1 Re, calculated as oxides.

3. The method of claim 1 wherein the temperature is 350–400° C.

4. The method of claim 1 in which the catalyst is in a fixed bed.

5. The method of claim 1 in which the catalyst is fluidized.

6. A method of preparing a mixture of acrolein and acrylic acid, comprising passing a mixture consisting of about 2.5 mols of oxygen and 4 mols of water vapor per mol of propylene through a fluidized catalyst bed at a temperature of about 375° C. and a cold contact time of about 18 seconds, the catalyst consisting essentially of on a molar ratio, 400 Ni, 400 Mo, 25 Te and 1 Re calculated as oxides.

7. The method of claim 6 in which the catalyst consisting essentially of on a molar ratio, 500 Ni, 500 Mo, 25 Te and 1 Re, calculated as oxides.

8. The method of claim 6 in which the temperature is about 400° C. and the catalyst on a molar ratio, consisting essentially of 670 Ni, 800 Mo, 50 Te and 1 Re, calculated as oxides.

References Cited
UNITED STATES PATENTS

| | | | |
|---|---|---|---|
| 2,662,921 | 12/1953 | Middleton | 260—604 |
| 3,192,259 | 6/1965 | Fetterly et al. | 260—533 |

LORRAINE A. WEINBERGER, *Primary Examiner.*

SIDNEY B. WILLIAMS, JR., *Assistant Examiner.*